Jan. 24, 1967 S. H. RASKIN 3,300,602
POSITION INDICATING SWITCH MEANS
Filed Sept. 4, 1963 3 Sheets-Sheet 1
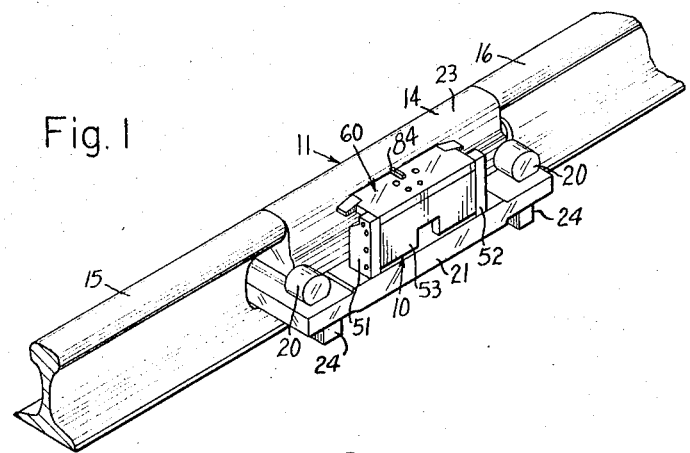
Fig. 1
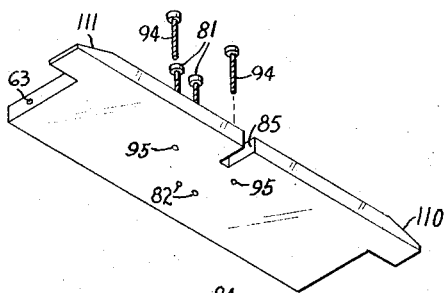
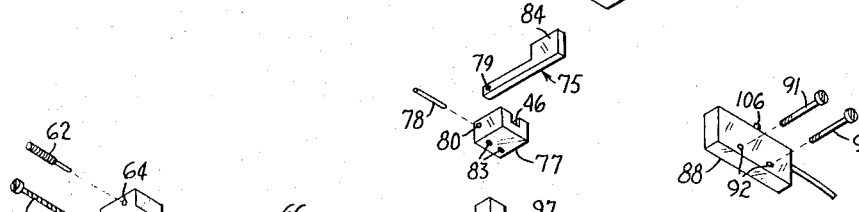
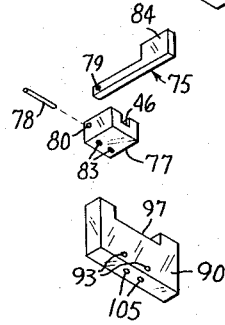
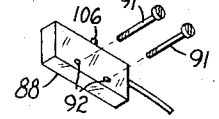
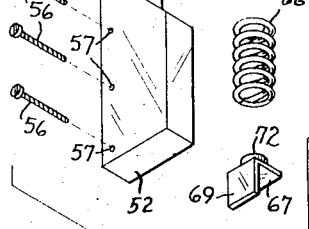
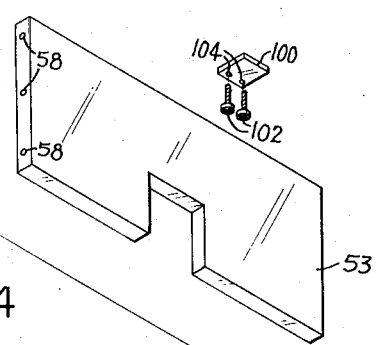
Fig. 4
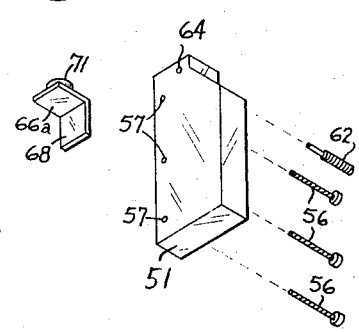
INVENTOR.
SEYMOUR H. RASKIN
BY Hastings Ackley
and
Walter J. Jag Jan. 24, 1967  S. H. RASKIN  3,300,602
POSITION INDICATING SWITCH MEANS
Filed Sept. 4, 1963  3 Sheets-Sheet 2

INVENTOR.
SEYMOUR H. RASKIN
BY Hastings Ackley
and
Walter J. Jagmin

INVENTOR.
SEYMOUR H. RASKIN

United States Patent Office 3,300,602
Patented Jan. 24, 1967

3,300,602
POSITION INDICATING SWITCH MEANS
Seymour H. Raskin, 4242 Lomo Alto,
Dallas, Tex. 75219
Filed Sept. 4, 1963, Ser. No. 306,574
6 Claims. (Cl. 200—61.41)

This invention relates to position indicating devices and more particularly to a switch operable when an object reaches a predetermined position.

In various apparatuses it is necessary to determine very accurately the moment when a body attains a predetermined position. For example, in the weighing apparatus illustrated in my co-pending application, Serial No. 226,514, filed September 27, 1962, Patent No. 3,155,184, which employs a weigh rail whose vertical deflection must be measured at the precise moment that each wheel of a railroad car is at the midpoint of the weigh rail in order that a true and accurate measurement be obtained of the load imposed on the weigh rail by such railroad car wheel, the moment at which each railroad car wheel is at the midpoint of the span of the weigh rail can be indicated by a switch actuated by the wheel as it moves over the midpoint of the span of the beam. Such switch must be actuated at the instant that each wheel is at the midpoint of the span regardless of the variations in the dimensions or configurations of the portions of the car wheels which engage such switch.

Accordingly, an object of this invention is to provide a new and improved position indicating device for indicating when a body moving in a predetermined path, such as a railroad car wheel, reaches a predetermined position in its path of movement.

Another object is to provide a switch device operable by rolling bodies, such as wheels, when each wheel reaches a predetermined position in the path of movement of the wheels.

Still another object is to provide a switch device which compensates for variations in the configuration of the wheels so that each wheel will actuate a switch when it attains such predetermined position regardless of its configuration.

A further object is to provide a switch device having a movable contact plate, engageable by a wheel as it moves toward and past a predetermined position, on which is mounted a switch operator means wherein the contact plate is positioned in the path of movement of the wheel and is movable by the wheel to place the switch operator means in position to be engaged by the wheel at the moment the wheel is in the predetermined position.

A still further object is to provide a switch device having a pivotable contact plate with a switch operator means mounted thereon wherein the contact plate is positioned in the path of movement of the wheels and is engaged by the peripheral portions of each wheel as each wheel engages the contact plate and moves it out of its path of movement so the switch operator means is engaged by the wheel when the wheel is at a predetermined position in its path of movement.

Still another object is to provide a new and improved switch device positionable adjacent a weigh rail whose deflection is to be measured as railroad car wheels move thereover which has a contact plate engageable with the periphery of each car wheel as it moves over the weigh rail and a switch mounted on the contact plate actuated each time a wheel moves over the contact plate whereby the movement of the contact plate compensates for variations in the configurations of the car wheels and the switch is actuated when each wheel is in a predetermined position on the weigh rail.

Additional objects and advantages of the invention will be readily apparent from the reading of the following description of a device constructed in accordance with the invention, and reference to the accompanying drawings thereof, wherein:

FIGURE 1 is a fragmentary perspective view showing a weigh rail constituting a section of a railroad track and the position indicating device embodying the invention positioned adjacent the weigh rail for operation by car wheels rolling over the weigh rail;

FIGURE 4 is an exploded view of the position indicating device;

Figure 2:
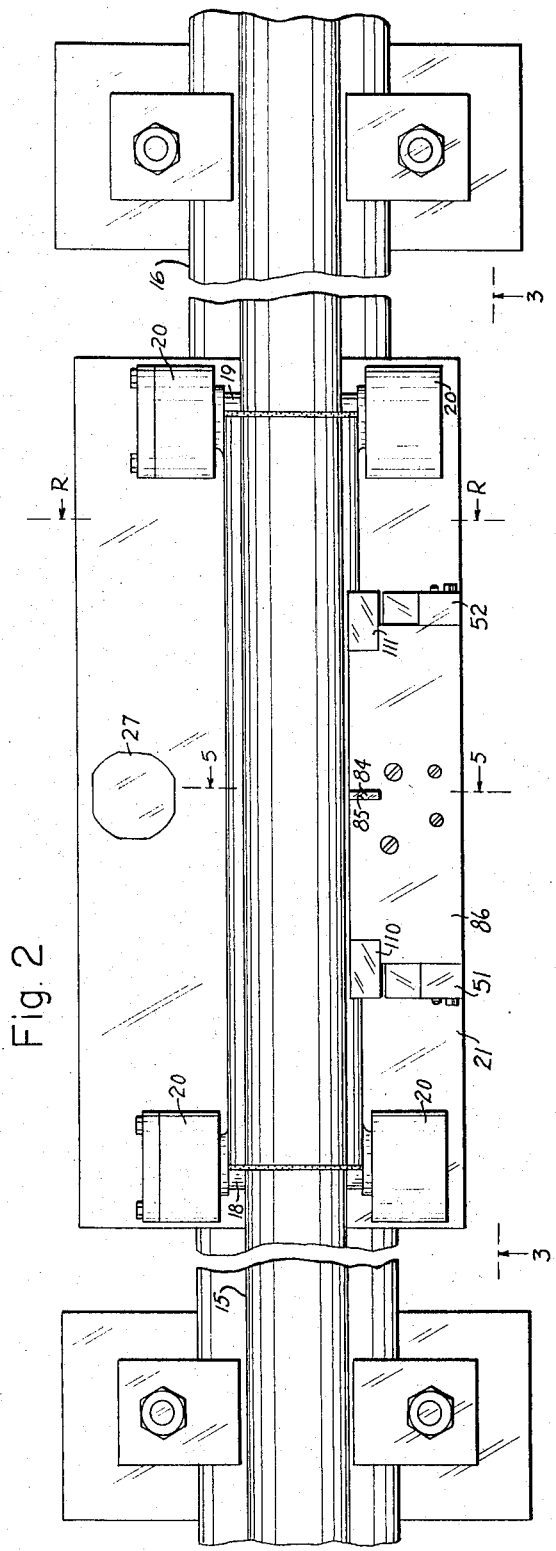
FIGURE 2 is a top view of the weigh rail and device illustrated in FIGURE 1.
Figure 3:
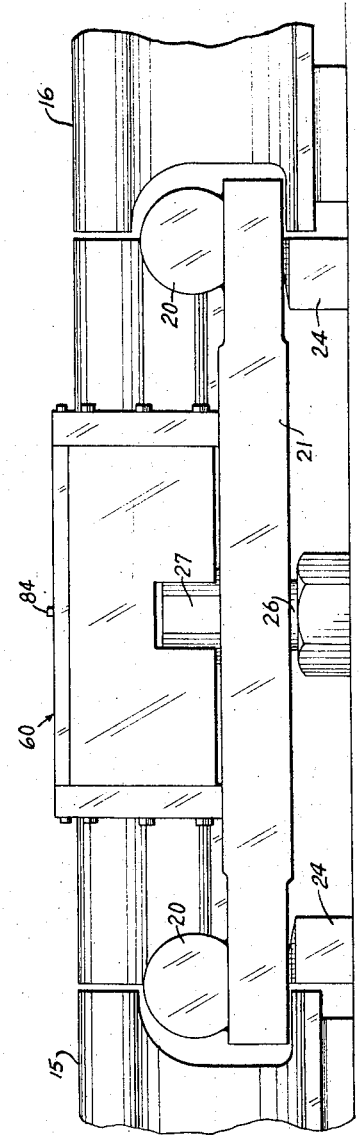
FIGURE 3 is a side view taken on line 3—3 of FIGURE 2.

Referring now to the drawings, the position indicating device 10 embodying the invention is shown in use with a weigh rail assembly 11 used to weigh the load of a railroad car wheel 12. The weighing apparatus 11 includes a weigh rail or beam 14 which extends between adjacent spaced ends of the sections 15 and 16 of a track rail along which a railroad car wheel 12 may roll. The weigh rail has a pair of horizontal support pins 18 and 19 rigidly secured thereto, as by welding, whose opposite end portions extend into suitable bearing housings 20 rigidly secured to a base plate 21 in any suitable manner, as by welding. The support pins are rotatably mounted in the bearing housings to permit free downward deflection of the weigh rail or beam as the load imposed thereon by a wheel moves across the upper load bearing surface or tread 23 of the weigh rail. The base plate rests on the upper surfaces of the bars 24 which are embedded in a suitable rigid base, such as concrete. The base plate is held on the support bars by means of the bolts 26 whose lower ends are embedded in the base and which have the cap nuts 27 threaded on the upper ends thereof. The mode of operation of the weigh rail assembly is fully described in my co-pending application, Serial No. 226,514, Patent No. 3,155,184, and will not therefore be fully described herein, it being apparent that the deflection of the weigh rail or beam 14 is proportional to the weight of the load imposed thereon by a railroad car wheel 12 as it rolls thereover and that it is desirable that the deflection of the weigh rail be measured when the wheel is at the midpoint of the span of the beam in order to assure greatest accuracy of measurement.

The position indicating device 10 includes a housing which comprises a pair of end walls 51 and 52, rigidly secured to the base plate 21 in any suitable manner, as by welding, and a side wall 53 which extends between the end plates and is rigidly secured thereto by the screws 56 which extend through suitable apertures 57 in the end plates into threaded bores 58 in the vertical end surfaces of the side plate.

Figure 5:
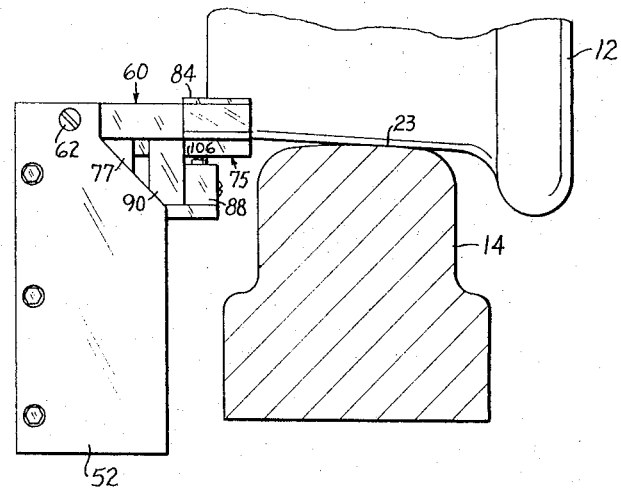
FIGURE 5 is a sectional view taken on line R—R of FIGURE 2 showing a car wheel moving over the weigh rail toward the position indicating device and before it has engaged the contact plate.
Figure 6:
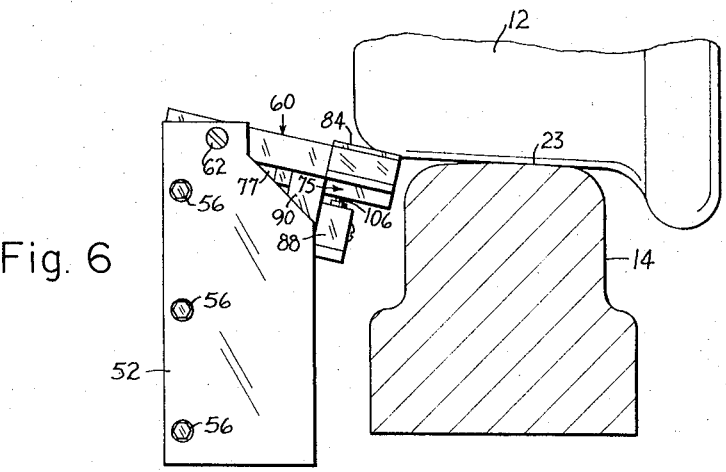
FIGURE 6 is a view similar to FIGURE 5 showing the contact plate engaged by the peripheral surface of the wheel and depressed thereby and showing the wheel approaching the switch actuating means mounted on the contact plate; and, FIGURE 7 is a sectional view taken on line S—S of FIGURE 2 showing the wheel in engagement with the switch actuating means mounted on the contact plate.
Figure 7:
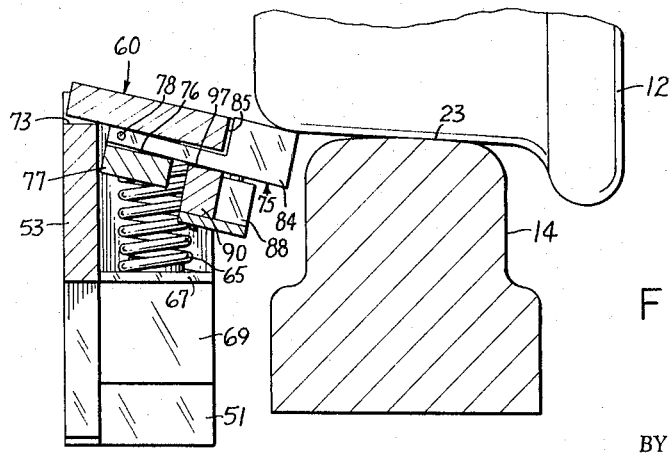

A contact plate 60 is secured to the end walls for pivotal movement about a horizontal axis by a pair of pivot pins 62 which extend into the aligned bores 63 in vertical sides of the contact plate and whose outer threaded end portions are received in the threaded bores 64 of the end walls. The contact plate is biased in a counter clockwise direction, as seen in FIGURES 5, 6 and 7 by a pair of springs 65 and 66 whose lower ends abut the horizontal brackets 66 and 67. The vertical legs 68 and 69 of the brackets abut the inner surfaces of the end walls 51 and 52, respectively, and are rigidly secured thereto in any suitable manner, as by welding. The brackets 66 and 67 have spring retainer pins 71 and 72, respectively, which extend into the lower portions of the springs 65 and 67. The upper ends of the springs bear against the lower surfaces of the contact plate and thus bias the contact plate upwardly in a counter clockwise direction. Pivotal movement of the contact plate in a counter clockwise direction is limited by the engagement of its bottom surface with the upper top edge or shoulder 73 of the side wall.

A switch actuator lever 75 is disposed in the upwardly opening slot or recess 76 of the mount block 77 and is pivotally secured thereto by a pivot pin 78 which extends through aligned apertures 79 and 80 in the outer end of the lever and in the mount block, respectively. The mount block is secured to the bottom surface of the contact plate by a pair of screws 81 which extend through the bores 82 of the contact plate into suitable threaded bores 83 of the mount block.

The actuator lever has an arm 84 which extends through the slot 85 of the contact plate so that its upper surface normally extends slightly above the top planar surface 86 of the contact plate. The extent of projection of the arm 84 is exaggerated in FIGURES 5 and 6.

A microswitch 88 is rigidly secured to a mount block 90 by means of the screws 91 which extend through suitable apertures in the microswitch housing into the threaded bores 93 of the switch mount block 90. The switch mount block is rigidly secured to the bottom surface of the contact plate by the screws 94 which extend through suitable bores 95 of the contact plate into suitable upwardly opening threaded bores of the switch mount block 90. The switch mount block has an upwardly opening recess 97 through which extends the lever 75. A support plate 100 on which the housing of the microswitch 88 rests is rigidly secured to the bottom surface of the switch mount block by the screws 102 which extend through suitable apertures 104 of the support plate into the threaded bores 105 of the switch mount block.

The actuator button 106 of the microswitch engages the bottom surface of the actuator lever 75 and is depressed to close the microswitch when the actuator lever is pivoted in a clockwise direction about its pivot pin 78. The actuator button is biased upwardly by the conventional biasing spring (not shown) of the microswitch which also holds the actuator lever 75 in its upper position illustrated in FIGURES 5 and 6.

The contact plate has a pair of inclined surfaces 110 and 111 at its opposite ends which extend downwardly from the top planar surface 86 and are disposed in the path of movement of peripheral outer portions of the wheels 12 rolling over the weigh rail. Each wheel first engages an inclined surface, e.g., the surface 110 and pivots the contact plate downwardly in a clockwise direction, as seen in FIGURES 5, 6 and 7, until the wheel engages the planar top surface 86, then rolls over the top surface and over the inclined surface 111. As the wheel rolls over the inclined surface 111 it gradually permits the contact plate to pivot upwardly in a counter clockwise direction to its normal upper position. The provision of the inclined surfaces 110 and 111 decreases the shock or vibration imparted to the contact plate by the engagement therewith of the wheels 12 as they roll over the weigh rail.

As the wheel rolls over the planar top surface 86 of the contact plate, it engages and depresses the switch actuator lever 75 when it reaches the midpoint of the span of the weigh rail and thus closes the microswitch, if it is normally open, or opens the microswitch if it is normally closed, when the wheel is at the midpoint of the span of the weigh rail. The microswitch is of course connected in any suitable circuit which controls the operation of any desired apparatus such as a computer, recorder, and the like.

It will be apparent that the contact plate automatically compensates for variations in the configurations of the outer peripheral portions or surfaces of the car wheels 12 engaged thereby since such portions, due to manufacturer's tolerances, differences in design or wear, vary from wheel to wheel.

If the housing of the microswitch 88 were rigidly secured relative to the weigh rail at a position at which it would be actuated by a wheel of normal or standard configuration when the latter reached the midpoint of the span of the beam, a wheel of larger radius at the outer surface thereof engageable with the button 106 than the standard wheel would depress the button 108 and actuate the switch 88 before the wheel reached the midpoint of the span of the weigh rail. A wheel of smaller radius at the outer surface thereof engageable with the button 106 than the standard wheel would actuate the switch after the wheel had moved past the midpoint of the span of the beam. The provision of a movable mounting or contact plate for the switch which automatically compensates for the differences in the radii or configuration of the outer peripheral portions of such wheels engaged thereby causes the switch to be actuated when each wheel is at the predetermined position on the weigh rail regardless of the variations in the configurations of such outer peripheral portions of the wheels.

It will now be seen that a new and improved switching device for indicating the position of a moving object, such as a railroad car wheel, has been illustrated and described which includes a plate positionable in the path of movement of the wheel and movable thereby out of the path and a switch mounted on the plate having means engageable by the wheel for actuating the switch when the wheel is at a predetermined location or position relative to the contact plate.

It will further be seen that the position indicating device includes means for mounting the contact plate in the path of movement of a moving object, such as a railroad wheel, means biasing the plate into the path of movement of the moving means, and a switch mounted on the plate and having actuator means engageable by the moving object as the moving object moves past the plate and reaches a predetermined ponition relative to the contact plate.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A position indicating device including a support means; a plate mounted on said support means for pivotal movement about an axis substantially parallel to the path of movement of an object, said plate having a surface engaged by the object as the object moves past the plate and moves it out of its path of movement; and operator means carried by said plate and extending past said surface for engagement by said object when the object is at a predetermined position in its path of movement and relative to said plate, said operator means when engaged by the object indicating the position of the object.

2. A position indicating device including: a support means; a plate mounted on said support means for pivotal movement about an axis substantially parallel to the path of movement of an object, said plate having a surface engaged by the object as the object moves past the plate and moves it out of its path of movement; means biasing said plate into position to be engaged by the object during its movement in said path; and operator means carried by said plate and extending past said surface for engagement by said object when the object is at a predetermined position in its path of movement and relative to said plate, said operator means when engaged by the object indicating the position of the object.

3. A position indicating device including a support means; a plate mounted on said support means for pivotal movement about an axis substantially parallel to the path of movement of an object, said plate having a surface engaged by the object as the object moves past the plate and moves it out of its path of movement; operator means carried by said plate and extending past said surface for engagement by said object when the object is at a predetermined position in its path of movement and relative to said plate; and switch means carried by said plate and actuated by said operator means.

4. A device for indicating the position of a wheel rolling along a track including: a plate mounted for pivotal movement about an axis extending parallel to and adjacent a track; means biasing said plate into the path of movement of a peripheral portion of a wheel rolling along the track, said plate having a surface engageable by the peripheral portion of a wheel and being movable out of the path of movement of the wheel; and operator means carried by said plate extending past said surface for engagement by the peripheral portion of the wheel as it moves past said plate and moves it out of its path of movement.

5. A device for indicating the position of a wheel rolling along a track including: a plate mounted for pivotal movement about an axis extending parallel to and adjacent a track; means biasing said plate into the path of movement of a peripheral portion of a wheel rolling along the track, said plate having a surface engageable by the peripheral portion of a wheel and being movable out of the path of movement of the wheel; switch means carried by said plate; and operator means for actuating said switch means carried by said plate extending past said surface for engagement by the peripheral portion of the wheel as it moves past said plate and moves it out of its path of movement.

6. The device of claim 5 wherein said operator means comprises a lever pivotally mounted on said plate engageable with said switch means and having a portion extending past said surface.

References Cited by the Examiner

UNITED STATES PATENTS 3,027,075    3/1962    Howdle et al. _____ 200—61.41

FOREIGN PATENTS 452,278    8/1936    Great Britain.
473,821    10/1937    Great Britain.

BERNARD A. GILHEANY, *Primary Examiner.*

B. DOBECK, J. BAKER, *Assistant Examiners.*